US009342964B2

(12) United States Patent
Angus et al.

(10) Patent No.: US 9,342,964 B2
(45) Date of Patent: May 17, 2016

(54) MEDIA ITEM CHARACTERIZATION

(71) Applicant: NCR Corporation, Duluth, GA (US)

(72) Inventors: Robin Angus, Scotland (GB); Rene Holkema, Sleeuwijk (NL)

(73) Assignee: NCR Corporation, Duluth, GA (US)

( * ) Notice: Subject to any disclaimer, the term of this patent is extended or adjusted under 35 U.S.C. 154(b) by 327 days.

(21) Appl. No.: 13/690,823

(22) Filed: Nov. 30, 2012

(65) Prior Publication Data

US 2014/0151272 A1 Jun. 5, 2014

(51) Int. Cl.
*G06F 7/00* (2006.01)
*G07F 19/00* (2006.01)

(52) U.S. Cl.
CPC .................................... *G07F 19/202* (2013.01)

(58) Field of Classification Search
None
See application file for complete search history.

(56) References Cited

U.S. PATENT DOCUMENTS 6,573,983 B1 * 6/2003 Laskowski ...................... 356/71
2009/0166269 A1 * 7/2009 Tanaka ............... G07D 11/0084 209/534
2009/0301791 A1 * 12/2009 McPhail ................ G01G 23/10 177/25.17
2009/0324053 A1 * 12/2009 Ross .................... G06K 9/2018 382/137
2010/0185317 A1 * 7/2010 Aso .................... G07D 11/0018 700/214

* cited by examiner

*Primary Examiner* — Yolanda Cumbess
(74) *Attorney, Agent, or Firm* — Schwegman, Lundberg & Woessner

(57) ABSTRACT

A deposit module is described. The deposit module comprises: a port for receiving a bunch of media items; a bunch characterization device operable to characterize the bunch prior to individual media items being removed from the bunch of media items; and a media separator for removing individual media items from the bunch and for transporting the removed individual media items to a media item validator subsequent to characterization of the bunch of media items.

16 Claims, 4 Drawing Sheets

MEDIA ITEM CHARACTERIZATION

FIELD OF INVENTION

The present invention relates to media item characterization. In particular, though not exclusively, the invention relates to media item characterization in a self-service terminal.

BACKGROUND OF INVENTION

A self-service terminal (SST) is typically used to provide customers with information or transactions in an unattended environment. A common type of SST is an automated teller machine (ATM). One type of ATM enables a customer to insert media items (such as cash and/or checks) for (i) depositing, (ii) cashing (in the case of checks), or (iii) recycling (in the case of cash).

One problem associated with depositing cash is that it is possible that the deposit transaction is interrupted. For example, there may be a power failure during the transaction, or some inserted banknotes may become stuck (jammed) within the ATM before the banknotes can be validated. This may lead to a dispute between the customer and owner of the ATM (typically, but not always, a financial institution) as to the amount of cash that was inserted before the disruption occurred. Currently, the owner of the ATM performs a reconciliation process using error logs, application counts, and cash recovered from transport mechanisms in the ATM by a service engineer who was called to repair the ATM. This process is time-consuming, expensive, and leads to a poor customer experience.

One problem associated with dispensing cash is that a fraudulent customer may remove part of a presented bunch, allowing the remaining part of the bunch to be retracted. The ATM would record this as the customer not taking the dispensed cash. However, when the contents of the purge bin (which receives the remaining part of the cash) are reconciled with the transaction, only some of the dispensed cash would be present.

It is among the objects of an embodiment of the present invention to provide an improved process for reconciliation of disrupted transactions in an ATM.

SUMMARY OF INVENTION

Accordingly, the invention generally provides methods, systems, apparatus, and software for providing an estimate of the number of media items in a transport path of a self-service terminal. The transport path may be at an entrance/exit of the self-service terminal, or it may be an internal transport path. The estimate of the number of media items may relate to media items presented to a self-service terminal as part of a media insertion operation, prior to any attempt to transport those media items.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a deposit module comprising: a port for receiving a bunch of media items; a bunch characterization device operable to characterize the bunch prior to individual media items being removed from the bunch of media items; a media separator for removing individual media items from the bunch and for transporting the removed individual media items to a media item validator subsequent to successful characterization of the bunch of media items.

A successful characterization of the bunch of media items may be satisfied by the deposit module being able to take a measurement or capture an image of the bunch of media items. Alternatively, a successful characterization of the bunch of media items may only be satisfied by the bunch of media items conforming to an acceptance criterion. The acceptance criterion may comprise one or more of the following: (i) the size of the bunch being less than a defined maximum size; (ii) the number of media items being fewer than a preset maximum number of media items; (iii) each edge of the media items being narrower than a preset maximum width; (iv) the bunch of media items being lighter than a preset maximum bunch weight; and/or (v) the bunch of media items being lighter than an expected weight for that number of media items (to ensure that there are no foreign objects (such as paperclips, staples, or the like) within the bunch of media items)).

The bunch characterization device may comprise a weigh scale operable to measure the weight of the bunch of media items. Suitable weigh scale arrangements may be similar to those provided commercially in stand-alone banknote counters by a number of different vendors, such as Talaris (trademark), Cashmaster International (trademark), Tellermate (trademark) and others.

The weigh scale may comprise a load-cell arrangement. The load-cell arrangement may be similar to that described in U.S. Pat. No. 4,447,885 assigned to Perkam Limited, which is incorporated herein by reference.

The weigh scale may be coupled to a processor operable to derive an approximate number of media items based on the weight of the bunch of media items. The processor may derive the approximate number by dividing the weight of the bunch of media items by the average weight per media item; or by accessing a table listing numbers of media items in a bunch and the total weight of such a bunch.

The processor may be operable to provide an output indicating the number of media items in the bunch of media items.

Alternatively, or additionally, the bunch characterization device may comprise an imager operable to capture an image of edges of the bunch of media items (referred to herein as a "bunch edge image"). The bunch characterization device may also include an illumination source to ensure that the imager captures a high quality bunch edge image. The bunch characterization device may further comprise a processor for counting media item edges on the bunch edge image. The processor may implement an edge counting algorithm, such as a Canny edge detector, or any other convenient edge detection algorithm. The processor may provide an output indicating the number of media items counted from the bunch edge image.

A Canny edge detector algorithm is described in Canny, J., "A Computational Approach To Edge Detection", IEEE Trans. Pattern Analysis and Machine Intelligence, 8(6):679-698, 1986. An improved technique for Canny edge detection is described in R. Deriche, "Using Canny's criteria to derive a recursively implemented optimal edge detector", Int. J.

Computer Vision, Vol. 1, pp. 167-187, April 1987. Both of these disclosures are incorporated herein by reference.

Alternatively, or additionally, the bunch characterization device may comprise a detector operable to measure the thickness of the bunch of media items. The detector may be a contact sensor or a non-contact sensor. The detector may measure the thickness of the bunch directly (by measuring the media items) or indirectly (for example, by measuring the displacement of a pressure plate that urges the bunch of media items against a removal plate). Suitable detectors include displacement sensors (which may be based on, for example, optical, magnetic (such as Hall effect) piezoelectric, ultrasonic, inductive, or capacitive technologies).

The detector may be coupled to a processor operable to derive an approximate number of media items based on the thickness of the bunch of media items. The processor may derive the approximate number by dividing the thickness of the bunch of media items by the average thickness per media item; or by accessing a table listing numbers of media items in a bunch and the total thickness of such a bunch.

The processor may be operable to provide an output indicating the approximate number of media items in the bunch of media items.

The port for receiving a bunch of media items may comprise a pocket media holder (which retains media items in a generally upright orientation), or a bunch slot (which retains media items in a generally horizontal orientation). As used herein the orientation of a media item relates to the orientation of a face of the media item.

The deposit module may comprise a media depository or a media recycler.

The deposit module may store the estimate of the number of media items in a bunch (and any image of the bunch) in a memory for subsequent retrieval.

The port may be operable to present a bunch of media items to a customer and to receive a bunch of media items from a customer. The bunch characterization device may be operable to characterize a bunch of media items prior to presenting the media items to a customer, and also to characterize a bunch of media items in the event that those media items were not completely removed by the customer.

If the bunch characterization device ascertains that the bunch of media items exceeds a preset limit, then the deposit module may generate an error signal indicating that the media bunch will not be transported within the deposit module. A terminal incorporating the deposit module may then indicate to a customer that the customer should remove the bunch of media items and insert fewer media items.

The preset limit may comprise a maximum bunch size (overall thickness of the bunch) and/or a maximum number of items in the bunch.

According to a second aspect of the present invention there is provided a method of media item characterization, the method comprising: receiving a bunch of media items; characterizing the bunch of media items; and removing individual media items from the bunch of media items, if the bunch of media items has been successfully characterized.

Characterizing the bunch of media items may include estimating the number of media items in the bunch without physically moving any media item in the bunch. By estimating the number of media items in the bunch without physically moving any of the media items, there is a greatly reduced possibility of causing the media items to jam.

Estimating the number of media items in the bunch may include capturing an image of the edges of the media items in the bunch (a “bunch edge image”), and counting the number of edges of the media items in the bunch to estimate the number of media items present.

Counting the number of edges of media items in the bunch may be performed using a processor implementing a computer algorithm, such as a Canny edge detection algorithm, or any other suitable algorithm.

Alternatively, or additionally, estimating the number of media items in the bunch may include weighing the bunch of media items. Weighing the bunch of media items may be performed using a load-cell located at a port into which the bunch of media items are inserted by a customer.

The method may comprise the further step of: saving the estimated number of media items into a log for future access in reconciling a transaction in the event that one or more media items in the bunch of media items cannot be transported.

Alternatively, or additionally, estimating the number of media items in the bunch may include measuring the thickness of the bunch of media items. This may be performed by a detector, such as a displacement measuring sensor.

The method may comprise the further step of: comparing the number of media items removed from the bunch of media items until all media items have been removed, with the estimated number of media items in the bunch to create one or both of (i) an accuracy index and (ii) an average offset. The accuracy index indicates how accurate the estimate of the number of items is based on the actual number of items. The average offset indicates by how much the estimate is above or below the actual number.

The accuracy index and the average offset may be adjusted each time a bunch of media items is correctly handled (that is, each time an entire bunch of media items is transferred, media item by media item, to a media item validator.

The accuracy index and the average offset may be used as part of the step of estimating the number of media items in the bunch without physically moving any media item in the bunch. This may provide an improved estimate.

Characterizing the bunch of media items may comprise imaging the bunch of media items, but not estimating the number of media items until a disruption event occurs. A disruption event may comprise a power failure, a media item jam, or the like.

The method may further comprise the steps of: detecting that one or more media items from the bunch of media items cannot be transported; and prompting a customer to enter the number of media items inserted and/or the total value of media items inserted.

The method may further comprise the steps of: providing the customer with the estimate of the number of media items in the bunch in response to the customer entering the number of items inserted.

The method may further comprise the steps of: displaying the bunch edge image to the customer.

Characterizing the bunch of media items may comprise ascertaining if the bunch of media items exceeds a preset limit.

In the event that the bunch of media items exceeds the preset limit, then the bunch of media items is not successfully characterized and method may include the step of generating an error signal indicating that the media bunch will not be transported within the deposit module.

In the event that the bunch of media items is not successfully characterized, the method may include the further step of indicating to a customer that the customer should remove the bunch of media items and insert fewer media items.

According to a third aspect of the present invention there is provided a method of reconciling an interrupted transaction at a self-service terminal, the method comprising: conveying any media items located in transport sections of the terminal to a segregated receptacle, if possible; providing transaction-related information from a log; and providing an estimate of a number of media items entered as part of the interrupted transaction using information obtained by characterizing the bunch of media items without physically moving any media item in the bunch.

The segregated receptacle may comprise a retract bin (in the event that the media items from the bunch cannot be returned to the customer during the transaction) or an entrance/exit port (in the event that some media items from the bunch can be returned to the customer during the transaction).

According to a fourth aspect of the present invention there is provided a self-service terminal comprising a user interface defining an entrance region for receiving a bunch of media items; and a deposit module aligned with the entrance region, the deposit module comprising: a bunch characterization device operable to characterize the bunch of media items prior to individual media items being removed from the bunch of media items; and a media separator for removing individual media items from the bunch and for transporting the removed individual media items to a media item validator subsequent to successful characterization of the bunch of media items.

The deposit module may comprise a depository or a recycler.

The self-service terminal may comprise an automated teller machine (ATM), a self-checkout terminal, or the like.

The bunch of media items may comprise banknotes, checks, or a mix of banknotes and checks.

The entrance region may comprise a pocket or a bunch slot.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
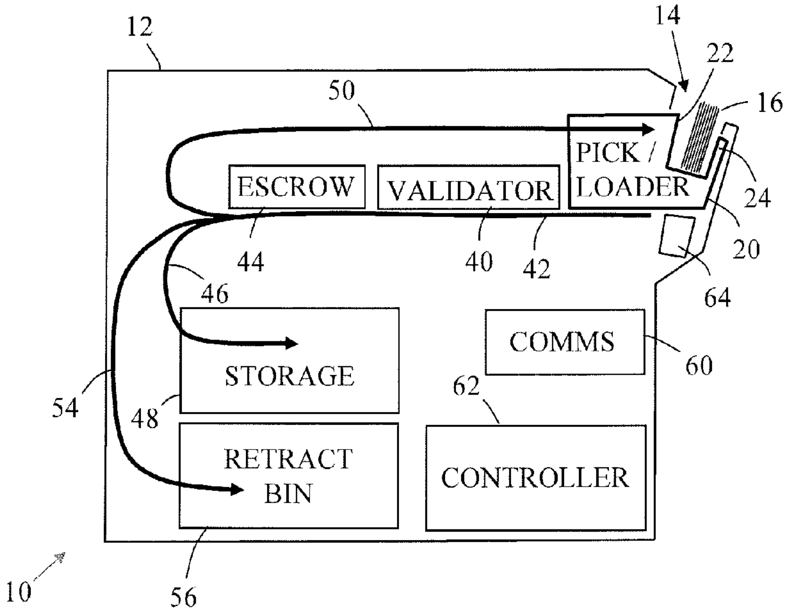
FIG. 1 is a schematic diagram of a deposit module according to one embodiment of the present invention.
Figure 2:
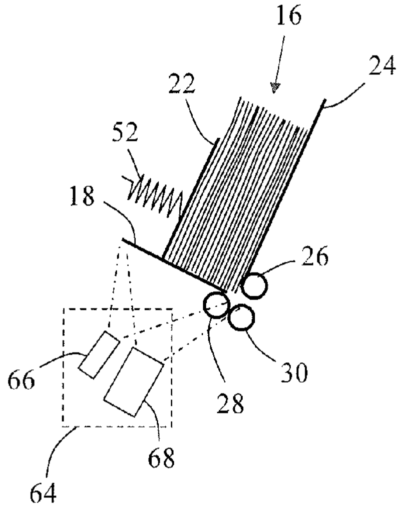
FIG. 2 is a schematic diagram illustrating parts (a bunch characterization device and an entrance/exit port) of the deposit module of FIG. 1.
Figure 3:
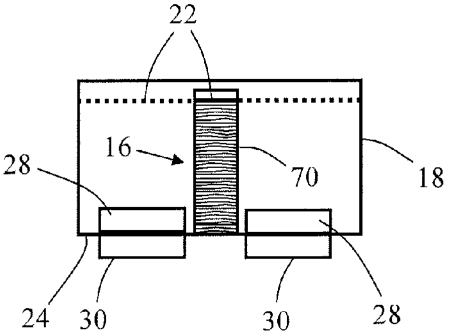
FIG. 3 is a schematic diagram illustrating the entrance/exit port of FIG. 2 in more detail.

Reference will now be made to FIGS. 1 to 3, which are schematic diagrams of a deposit module 10 (and parts thereof) according to one embodiment of the present invention. The deposit module 10 is operable to receive media items in the form of bunches of banknotes and/or checks from a customer.

The deposit module 10 includes a metal chassis 12 onto which various parts are mounted. The chassis 12 defines an entry/exit port 14 for receiving a bunch of media items (the media bunch) 16. The port 14 is designed to align with an entrance region (not shown in FIGS. 1 to 3) defined on an ATM (not shown in FIGS. 1 to 3) so that a customer at the ATM can insert a bunch of media items into the port 14. This is referred to as a pocket interface. The port 14 is an entrance/exit port that allows a customer to insert and remove a bunch of media items.

The port 14 includes a picker/loader unit 20. The picker/loader unit 20 performs three functions.

The first function of the picker/loader unit 20 is to receive and hold the media bunch 16 to allow either the entire media bunch 16 to be removed by the customer (in the event that the customer cancels the transaction (described below)) or to allow individual media items to be removed (in the event that some, but not all, media items are rejected by the deposit module 10). The media bunch 16 rests on a platform 18 (best seen in FIG. 2).

The second function of the picker/loader unit 20 is to remove individual media items from the media bunch 16. As best seen in FIG. 2, the picker/loader unit 20 includes a pressure plate 22 that urges the media bunch 16 against a removal plate 24. The picker/loader unit 20 removes from the media bunch 16 the nearest media item to the removal plate 24 using a friction roller 26 (FIG. 2) protruding through the removal plate 24, a retard roller 28 (FIG. 2) cooperating with the friction roller 26, and a transport roller 30 (FIG. 2).

The removed (or picked) media item is then transported to a media item validator 40 along a media transport path illustrated by arrow 42. Thereafter, the media item is transported from the validator 40 to an escrow unit 44. The escrow unit 44 temporarily holds validated media items (or sheets) until the customer confirms that he/she wants to complete the transaction.

There are several different routes that can be taken by a media item when it leaves the escrow unit 44. The first route is shown by arrow 46 and involves the media item being transported into a storage compartment 48, where it is safely stored until the storage compartment 48 is emptied by authorized personnel. When that route 46 is chosen, the customer's account is typically credited with the value of the media items deposited (which may be checks or banknotes, or a mixture of checks and banknotes). It should be appreciated that for simplicity only one storage compartment is illustrated, but the deposit module 10 may comprise multiple storage compartments, one for checks, and a plurality of storage compartments for banknotes, for example, one for each denomination or currency that is handled by the deposit module 10.

A second route is shown by arrow 50 and involves the media item being returned to the customer via the picker/loader unit 20 (which is the third function performed by the picker/loader unit 20). To return media items to the customer, the picker/loader unit 20 retracts the pressure plate 22 (which is normally urged towards the removal plate 24 by a spring 52 (FIG. 2)) and transports either a bunch of media items from the escrow unit 44 (or individual media items from the escrow unit 44) to an area between the retracted pressure plate 22 and the removal plate 24.

As is known in the art, whether a media item is stored (that is, follows the first route 46 in this embodiment) or returned to the customer (that is, the second route 50 in this embodiment) depends on a number of factors, such as: whether the media item is recognized, whether the media item is validated, whether the customer cancels or confirms the transaction, and the like.

A third route, shown by arrow 54, is possible if media items need to be retracted and segregated (for example, due to interruption during a transaction, such as a power fail, or if the customer does not remove deposited media items that are rejected by the media validator 40). In such an event, media items can be routed to a retract bin 56.

The deposit module 10 also includes a communications circuit board 60 for communicating with a self-service terminal (not shown in FIGS. 1 to 3) into which the deposit module 10 may be installed; and an onboard controller 62 for controlling the operation of the deposit module 10.

The deposit module 10 also includes a bunch characterization device 64 operable to characterize the media bunch 16 prior to individual media items being removed from the media bunch 16.

In this embodiment, as best seen in FIG. 2, the bunch characterization device 64 comprises an illumination source 66 and an imager 68.

As best seen in FIG. 3, which is a view as seen from the imager 68, the platform 18 defines a central aperture 70 that reveals edges of the media bunch 16 retained in the port 14. The illumination source 66 (which is a white light LED in this embodiment) directs light onto the central aperture 70. The imager 68 (which is a CMOS image sensor in this embodiment) is oriented to capture an image of the central aperture 70.

Figure 4:
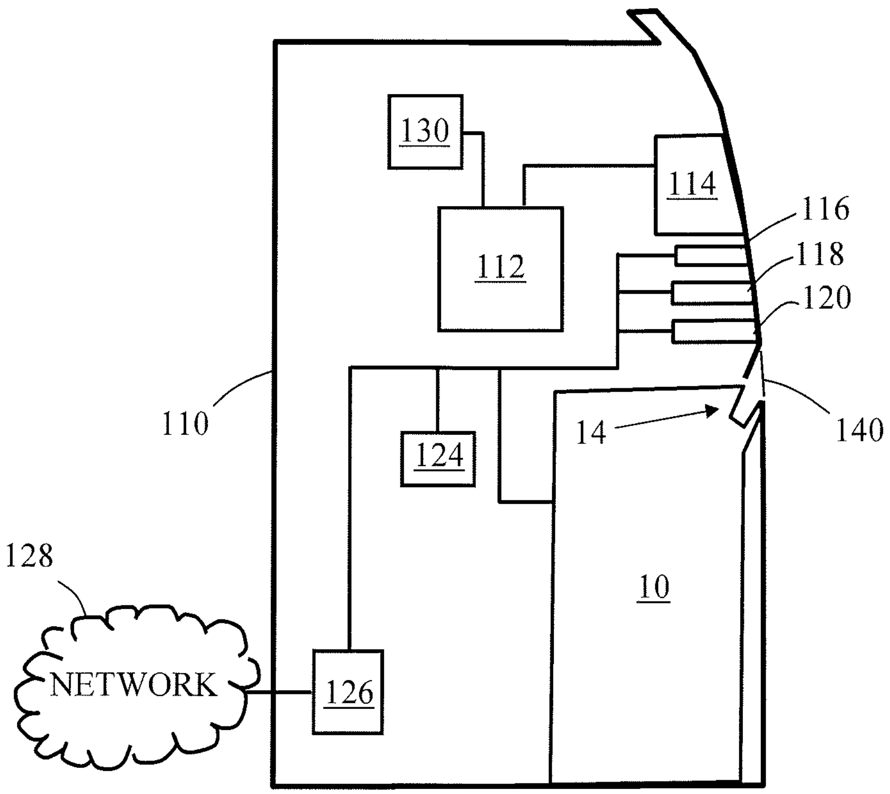
FIG. 4 is a pictorial diagram of a self-service terminal (in the form of an ATM) including the deposit module of FIG. 1.

Reference will now also be made to FIG. 4, which is a schematic diagram of an SST 110 (in the form of an ATM) incorporating the deposit module 10.

The ATM 110 comprises a plurality of ATM modules, including: an ATM controller 112, a customer display 114, a card reader/writer module 116, an encrypting keypad module 118, a receipt printer module 120, the deposit module 10, a cash dispenser module (not shown because it is obscured by the deposit module 10), a journal printer module 124 for creating a record of every transaction executed by the ATM 110, a network connection module 126 for accessing a remote authorization system (not shown) via a network 128, and an operator panel module 130 for use by a service operator (such as a field engineer, a replenisher (of currency, of printer paper, or the like), or the like).

The ATM 110 also includes an entry/exit pocket shutter 140 that can be raised by the ATM controller 112 to allow a customer to access the entry/exit port 14 in the deposit module 10. The entry/exit pocket shutter 140 can also be lowered by the ATM controller 112 to cover the entry/exit port 14.

The customer display 114, the card reader/writer module 116, the encrypting keypad module 118, the receipt printer module 120, a cash dispenser shutter (not shown), and the entry/exit pocket shutter 140 provide a user interface for the customer.

Figure 5A:
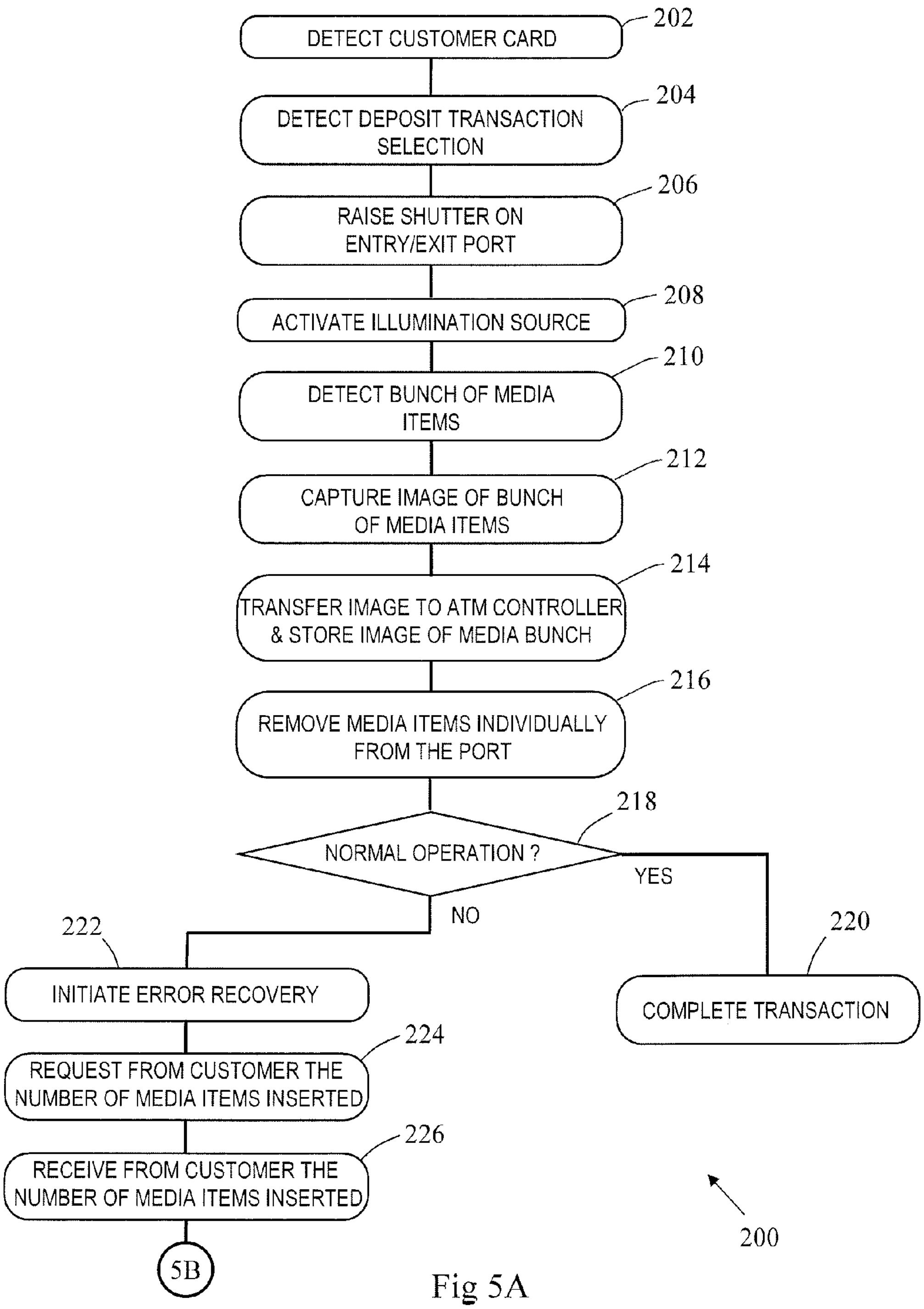
FIGS. 5A-5B form a flowchart, split over two pages for clarity, illustrating the operation of the bunch characterization device of FIG. 2 during a deposit transaction at the ATM of FIG. 4.
Figure 5B:
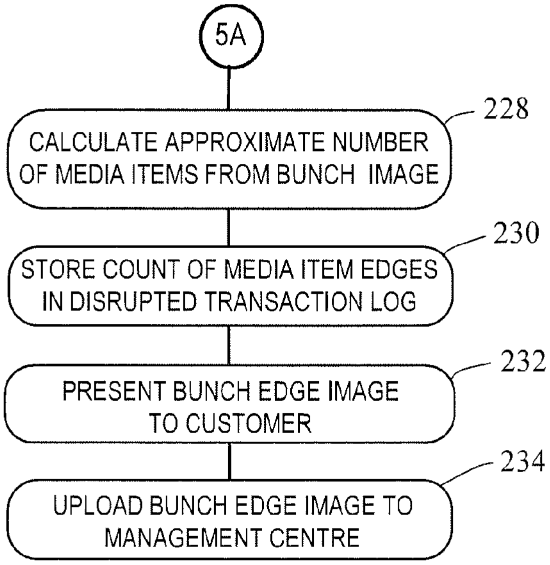

A deposit transaction involving the ATM 110 (and specifically the deposit module 10) will now be described with reference to FIGS. 5A-5B, which form a flowchart 200 illustrating the operation of the ATM controller 112, the deposit module controller 62, and the bunch characterization device 64 during a deposit transaction at the ATM 110.

Initially, a customer inserts an ATM card into the card reader/writer module 116, which is detected by the ATM 110 (step 202), and the customer selects (using the encrypting keypad 118) a deposit transaction presented on the customer display 114, which selection is detected by the ATM 110 (step 204).

The ATM controller 112 raises the entry/exit pocket shutter 140 on the ATM user interface to allow the customer to insert a bunch of media items (step 206).

The ATM controller 112 notifies the deposit controller 62, which activates the illumination source 66 within the entry/exit port 14 (step 208).

The customer then places a bunch 16 of media items that he/she wants to deposit into the entry/exit port 14, which is detected by a media sensor (not shown) within the deposit module 10 (step 210).

The ATM controller 112 may then lower the entry/exit pocket shutter 140.

The deposit controller 62 then characterizes the bunch, as will now be described.

On detecting the bunch of media items in the port 14, the deposit controller 62 activates the imager 68 to capture an image of the edges of the bunch of media items (the bunch edge image) that are visible through central aperture 70 (step 212).

The deposit controller 62 transfers the bunch edge image of the media bunch to the ATM controller 112, which stores this image together with identification information (such as account number, account name, card number, and the like) read from the customer's ATM card by the card reader module 116 (step 214).

The picker/loader unit 20 then removes individual media items and transports these individual media items, one by one, to the media validator 40 (step 216). If this operation continues normally (step 218) then all of the media items are removed from the entry/exit port 14 and the transaction is completed (step 220) in the same way as for a conventional deposit module.

However, if there is a transaction disruption event, for example if one or more of the individual media items jam, or if there is a power failure during picking or transport of the media items from the picker/loader unit 20, then normal operation does not occur (step 218); instead the ATM controller 112 initiates some recovery action (step 222).

The particular recovery action taken may depend on what went wrong. For example, if there was a power failure during transportation of the media items, then the ATM controller 112 may eject the customer's card and then instruct the deposit module 10 to route all of the media items within the transports of the deposit module 10 and in the entry/exit port 14 to the retract bin 56. In another example, one of the removed media items may become jammed in a transport within the deposit module 10 so that it cannot be returned to the picker/loader unit 20 nor transported to the storage compartment 48 or the retract bin 56. When such an event occurs, the ATM controller 112 may request the customer to remove any media items remaining in the entry/exit port 14.

The next step is for the ATM controller 112 to present a screen on the customer display 114 requesting the customer to type in (using the encrypting keypad module 118) the number of media items and/or the total value of media items that were originally inserted (step 224).

The ATM controller 112 receives from the keypad 118 a number indicating how many media items the customer claims to have inserted (step 226).

The ATM controller 112 then uses the bunch edge image captured by the CMOS imager 68 in step 212 to estimate the approximate number of media items that were originally inserted by the customer (step 228).

This is implemented by a processor (not shown) within the ATM controller 112 implementing a Canny edge detection filter algorithm programmed into the ATM controller 112 to count the number of edges present in the bunch edge image. This count represents the number of media items originally inserted. Since it may not be possible to distinguish between different denominations of banknote based solely on the edge information, or to distinguish between an edge of a check and an edge of a banknote, the number of edges detected only gives an indication of how much money was deposited.

The ATM controller 112 then stores this count of media item edges together with the bunch edge image and the customer's ATM card details in a disrupted transaction log within the ATM controller 112 (step 230).

The ATM controller 112 then presents the bunch edge image on the customer display 114 so that the customer can see that there is a record of the media items originally deposited by the customer (step 232). The ATM controller 112 may allow the customer to update the number of media items that he/she claims were present. If this occurs, then the updated deposit information claimed by the customer is also stored in the disrupted transaction log.

The ATM controller 112 also uploads the contents of the disrupted transaction log (the bunch edge image, the ATM card details, and the amount the customer claims to have inserted) to a remote management center (not shown) via the network 128 (step 234).

In the event of a media jam, the deposit module 10 then goes out of service until an authorized servicing person arrives (who is typically despatched by the remote management center).

When the authorized servicing person arrives, he/she uses the operator panel module 130 to check the disrupted transaction log and also checks the contents of the retract bin 56 to reconcile the transaction that was disrupted.

If the authorized servicing person indicates that only a small number of media items are present in the retract bin 56 and other parts of the deposit module 10, but the bunch edge image shows a large number of media items inserted by the customer, then this may indicate that fraud has occurred. Alternatively, if the bunch edge image shows a small number of media items present and the customer claims to have inserted a large number of media items, then this may indicate that the customer's claim may not be valid.

Figure 6:
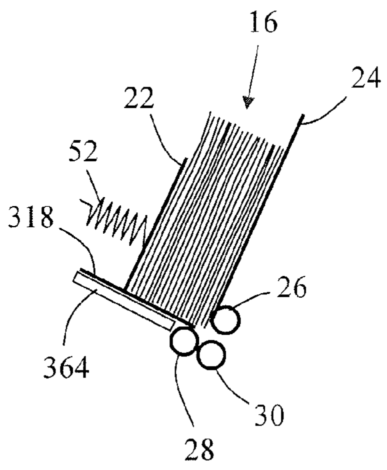
FIG. 6 is a schematic diagram illustrating an alternative bunch characterization device for use in the deposit module of FIG. 1.

Another embodiment of the present invention will now be described with reference to FIG. 6, which is a schematic diagram illustrating an alternative bunch characterization device 364 for use in a deposit module such as deposit module 10.

The bunch characterization device 364 comprises a load-cell arrangement integrated into the platform 318. The load-cell arrangement measures the weight of media items resting on the platform 318.

An SST incorporating a deposit module including such a bunch characterization device 364 stores values of weight corresponding to approximate numbers of media items represented by that weight. This provides an estimate of the number of media items present on the load-cell arrangement. For example, the controller 62 stores a table (not shown) that lists the number of media items in a bunch and the typical weight of such a bunch. Since the load-cell arrangement is very quick at estimating the number of media items in a bunch, this estimate is calculated and stored each time a bunch of media items is inserted by a customer.

In the event of a disrupted transaction, the estimate of the number of media items in the bunch based on the weight of the bunch is stored in the disrupted transaction log.

Figure 7:
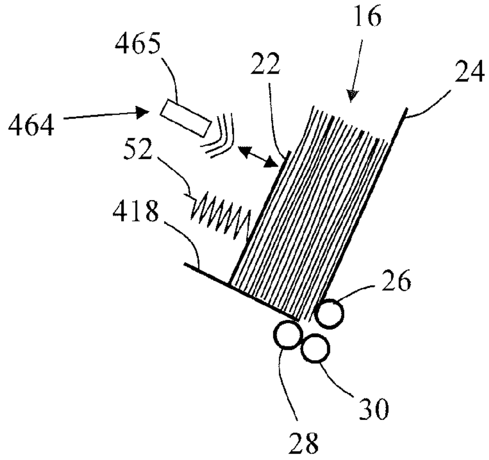
FIG. 7 is a schematic diagram illustrating a third type of bunch characterization device for use in the deposit module of FIG. 1.

Yet another embodiment of the present invention will now be described with reference to FIG. 7, which is a schematic diagram illustrating a third type of bunch characterization device 464 for use in a deposit module such as deposit module 10.

The bunch characterization device 464 comprises a detector 465 integrated into the platform 418. The detector 465 comprises an optical transceiver that emits light waves that are reflected by the pressure plate 22. Measuring the distance between the detector 465 and the pressure plate 22 enables the controller 62 to calculate the distance between the pressure plate 22 and the removal plate 24; in effect this is a measurement of the thickness of the bunch of media items.

An SST incorporating a deposit module including such a bunch characterization device 464 stores values of thickness (the distance between the pressure plate 22 and the removal plate 24) corresponding to approximate numbers of media items represented by that thickness. This provides an estimate of the number of media items present in the port 14.

In the event of a disrupted transaction, the estimate of the number of media items in the bunch based on the thickness of the bunch is stored in the disrupted transaction log.

Although described above in the context of estimating the number of media items inserted by a customer, the bunch characterization device 64, 364, or 464 can also be used when dispensing a bunch of media items (such as banknotes) to a customer.

In a recycler module (not shown), a bunch of banknotes can be transported to an entrance/exit port (similar to port 14). The bunch of banknotes can then be characterized prior to being presented to a customer. In a pocket-type recycler, the bunch is presented to a customer by the ATM raising the entry/exit pocket shutter 140 to allow the customer to access the bunch of media items. In a slot-type recycler, the bunch is presented to a customer by the ATM partially ejecting the bunch through the slot.

If the customer does not remove all of the bunch, then the recycler module will retract the bunch (or the remaining items in the bunch that were not removed in the event that some but not all media items were removed). When this occurs, then the bunch characterization device 64, 364, or 464 will re-characterize the bunch to estimate the number of media items remaining. In the event that the bunch characterization device 64, 364, or 464 detects fewer media items in the bunch than when the bunch was presented to the customer, then the controller will record this in memory as a potentially fraudulent activity. In a similar way as for the above embodiment, when the authorized servicing person arrives, he/she uses the operator panel module 130 to check the disrupted transaction log and also checks the contents of the retract bin 56 to reconcile the transaction that was disrupted by the customer not removing all of the presented bunch of banknotes.

Various modifications may be made to the above described embodiment within the scope of the invention, for example, in the first embodiment, the number of media items inserted is only estimated when a disrupted transaction occurs; in other embodiments, the ATM controller 112 (or the deposit module controller 64) may estimate the number of media items inserted for each deposit transaction. Each time a successful transaction occurs, the estimated number can be compared with the actual number to generate (i) an accuracy index and (ii) an offset. These may be updated after each transaction to provide a running average.

Another advantage of estimating the number of media items inserted for each deposit transaction is that the ATM controller 112 (or the deposit module controller 64) may detect when the bunch of media items does not meet an acceptance criterion; for example, when there are too many media items in the bunch, and/or the edges are too wide (possibly indicating a loop of paper around the media items), and/or the bunch is too heavy. This enables the ATM controller 112 (or the deposit module controller 64) to stop processing the bunch of media items, thereby preventing a potential media jam. The ATM (or other terminal in which the deposit module is mounted) may then indicate to the customer via the customer display 114 that the bunch is too large and should be removed and reduced in size before re-inserting.

In other embodiments, the SST may be a terminal other than an ATM.

In other embodiments, the port may comprise a bunch slot.

In other embodiments, an additional bunch characterization device may be provided in an internal part of the module to characterize a bunch of media items being transported to a reject bin (or purge bin).

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

The reader's attention is directed to all papers and documents which are filed concurrently with or previous to this specification in connection with this application and which are open to public inspection with this specification, and the contents of all such papers and documents are incorporated herein by reference.

What is claimed is:

1. A deposit module comprising:

a port for receiving a bunch of media items, the bunch of media items received by the port in a stack;

a bunch characterization device operable to capture bunch size verification data from the bunch prior to individual media items being removed from the bunch, wherein the bunch size verification data includes an image of edges of the bunch of media items while the media items are stacked in the bunch;

a media separator for removing individual media items from the bunch and for transporting the removed individual media items to a media item validator subsequent to successful characterization of the bunch of media items; and a processor for transferring the bunch size verification data to storage for later verification following a transaction disruption event.

2. A deposit module according to claim 1, wherein the bunch characterization device comprises a weigh scale operable to measure the weight of the bunch of media items.

3. A deposit module according to claim 1, wherein the bunch characterization device comprises an imager operable to capture the image.

4. A deposit module according to claim 3, wherein bunch characterization device also includes an illumination source to ensure that the imager captures a high quality image.

5. A deposit module according to claim 3, wherein the bunch characterization device further comprises a processor programmed to count the edges in the image.

6. A deposit module according to claim 5, wherein the processor is programmed with a Canny edge detector.

7. A deposit module according to claim 1, wherein the deposit module comprises a media recycler.

8. A method of media item characterization, the method comprising:

receiving a bunch of media items, the bunch of media items received in a stack;

capturing bunch size verification data from the bunch, including capturing an image of edges of the bunch of media items while the media items are stacked in the bunch;

removing individual media items from the bunch of media items; and transferring by a processor the bunch size verification data to storage for later verification following a transaction disruption event.

9. A method according to claim 8, wherein capturing occurs without physically removing any media item from the bunch.

10. A method of reconciling an interrupted transaction at a selfservice terminal, the method comprising:

conveying media items located in transport sections of the terminal to a segregated receptacle;

providing transaction-related information from a log; and providing an estimate of a number of media items entered in a stacked bunch as part of the interrupted transaction by counting edges of media items in an image captured while the media items were stacked in the bunch using information obtained by characterizing the bunch of media items without physically removing any media item from the bunch.

11. The method of claim 10, wherein the transaction-related information comprises customer identification information.

12. The method of claim 10, wherein an estimate further comprises determining the number by comparing a weight of the media items captured while the media items were stacked in the bunch with a weight from a lookup table of possible weights of bunches of media items.

13. The method of claim 10, further comprising:

receiving a customer entered number of the media items in the bunch; and comparing the customer entered number to the estimate, determining that a possible fraud has occurred when the customer entered number does not equal the estimate.

14. The method of claim 10, wherein counting edges is performed using an edge detector.

15. The method of claim 14, wherein the edge detector comprises a Canny edge detector.

16. The method of claim 14, further comprising:

displaying the image;

receiving a customer entered number of the media items in the bunch; and comparing the customer entered number to the estimate, determining that a possible fraud has occurred when the customer entered number does not equal the estimate.

* * * * *